2,863,845

VINYL CHLORIDE POLYMERS PLASTICIZED WITH MORPHOLIDE MIXTURE

Frank C. Magne, Evald L. Skau, and Robert R. Mod, New Orleans, La., assignors to the United States of America as represented by the Secretary of Agriculture No Drawing. Application August 19, 1955
Serial No. 529,599

3 Claims. (Cl. 260—30.4)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to unique mixed morpholides. More particularly, the invention provides the morpholides of a mixture of predominantly unsaturated fatty acids that can reproducibly be produced from the fatty acids found in natural glycerides. These mixed morpholides are solvent plasticizers having good compatibility with polymers and copolymers of vinyl chloride. And, they are also colorless liquids useful as insecticides, emulsifying agents, acid-binding stabilizing agents, and the like.

A morpholide of an acid is an amide of the acid in which the amido nitrogen atom is a nitrogen atom of a morpholine ring. Prior workers have produced the morpholides and other amides of various individual fatty acids and mixtures of fatty acids. Many of the fatty acid amides heretofore produced, e. g., those disclosed in U. S. Patents 1,986,854, 2,339,056 and 2,380,925, are solvent plasticizers for hydrophilic vinyl resins, such as the polyvinyl acetal resins.

A compound which is a solvent plasticizer for, and thus is compatible with, a hydrophilic vinyl resin such as a polyvinyl acetal resin, exhibits only a very limited compatibility with a hydrophobic vinyl resin such as polyvinyl chloride. If a resin is plasticized with a compound with which it has only a limited compatibility the plasticizer soon "bleeds out," unless the plasticizer is used in limited amount, or is used in conjunction with a mutual solvent to obtain adequate compatibility.

As might be expected from the known compatibility of various morpholides of fatty acids with the polyvinyl acetals, the morpholides of the glyceride oil acids are incompatible with polymers of vinyl chloride. However, we have discovered that the morpholides of the unique mixture of unsaturated fatty acids defined below exhibit good compatibility with vinyl chloride resins. The term "vinyl chloride resins" is used throughout the specification and claims to refer to polymers and copolymers of monomers containing vinyl chloride in a predominant proportion in parts by weight.

A primary object of the present invention is to provide mixed morpholides which are relatively light-stable solvent plasticizers for vinyl chloride resins, and which are plasticizers that can economically be produced from the glyceride oil acids. A further object is to provide mixed morpholides that contain epoxy groups, and are capable of both plasticizing and stabilizing vinyl chloride resins, and which are mixed morpholides that can be reproducibly produced from the glyceride oil acids.

The mixed morpholides provided by this invention comprise the morpholides of mixed saturated and unsaturated fatty acids, or the morpholides of mixtures of such fatty acids and epoxidized fatty acids, in which mixtures of acids, the weight proportions of saturated acids (S), monoolefinic acids (M), polyolefinic acids (P) and epoxidized fatty acids (E), are such that is from about $$\frac{S}{S+M+P+E}$$

$$\frac{1 \text{ to } 9}{100}$$

and $$\frac{P}{M+P+E}$$

is less than about $\frac{1}{10}$. The term "epoxidized fatty acids" is used to refer to the $C_{12}$ to $C_{22}$ alkanoic or alkenoic acids containing at least one epoxy group. Such acids are produced by the epoxidation of at least one olefinic group of an unsaturated fatty acid.

While such mixed morpholides can be produced in a variety of ways, they are preferably produced by reacting the mixed acids with morpholine, and, the mixed acids are preferably produced by fractionating the mixed saturated and unsaturated acids produced by saponifying a glyceride oil and acidifying the resulting salts. Where desirable, any polyolefinic fatty acids present in such a mixture of acids can be epoxidized to convert the mixed acids to a mixture of saturated and unsaturated fatty acids and epoxy-group-containing monoolefinic fatty acids.

Illustrative examples of materials from which the mixed acids can be obtained by saponification, acidification and fractionation include: cottonseed oil, peanut oil, neatsfoot oil, olive oil, palm oil, sunflowerseed oil, corn oil, sesame oil, soybean oil, safflower oil, menhaden oil, lard, and the like vegetable and animal oils, fats, or foots and the products of partially hydrogenating and/or epoxidizing such oils, fats, and foots containing acyl radicals correponding to mixtures of acids in the specified proportion.

Where a mixture of saturated and unsaturated fatty acids, such as the peanut oil acids, contains more than the indicated proportion of saturated fatty acid, i. e., where $$\frac{S}{S+M+P}$$

is greater than about $\frac{9}{100}$, an amount of saturated acid sufficient to leave only the indicated proportion can be selectively removed by a variety of procedures. A preferred procedure, which can also be applied to a mixture of saturated and unsaturated fatty acids containing some epoxy-group-containing monoolefinic fatty acids, embodies the conversion of the mixed acids to amine salts and the fractional crystallization of the amine salts. In carrying out this fractionation procedure, the acids are neutralized with morpholine, or with a mixture of cyclohexylamine and morpholine, or a mixture of dibenzylamine and morpholine, in which mixtures the amount of morpholine is enough to neutralize the unsaturated and the epoxidized acids. The resulting amine salts are fractionally crystallized at a temperature at which the less soluble amine salts of the saturated acids crystallize while the morpholine salts of the unsaturated and epoxidized acids remain dissolved in the mother liquor.

The fractional crystallization is preferably conducted in the presence of an organic solvent for the amine salts. Suitable solvents include liquid organic compounds or mixtures thereof which are miscible with and chemically inert toward the amine salts, as, for example: ketones, such as acetone and methyl ethyl ketone; alcohols, such as methyl, ethyl, isopropyl and tert-butyl alcohol; esters, such as methyl acetate, ethyl propionate, and amyl acetate; ethers, such as diethyl ether, dioxane and anisole; and hydrocarbons such as pentane, cyclohexane and benzene. Benzene and acetone and mixtures thereof have been found to be particularly suitable.

In the fractional crystallization, the temperature at which the less soluble saturated acid salts will crystallize while the unsaturated acid morpholine salts remain in solution will vary depending upon the particular acids, the particular solvent and the proportion of solvent employed. In general, it is preferable to cool a homogeneous solution of the acid salts to a temperature at which crystals form and to maintain the crystallizing solution at a temperature at which crystals form, until sufficient saturated acid salts have crystallized. The point at which sufficient saturated acid salts have crystallized can readily be determined by following the iodine and thiocyanogen values of the mother liquor. And, it is preferable to select the solvent and the proportion of solvent so that: (a) a homogeneous solution of the acid salts is formed at a temperature between room temperature and the boiling point of the solvent; and (b) as the solution is cooled, crystallization occurs at a readily attainable lower temperature. The fractional crystallization of enough saturated acid amine salts to leave in the mother liquor a mixture of acyl radicals which is equivalent to a mixture of acids in which $$\frac{S}{S+M+P+E} = \text{from about } \frac{2 \text{ to } 7}{100}$$

is preferred.

The fractionally crystallized amine salts of saturated acids can be isolated by filtration, centrifugation or the like methods of isolating a precipitate from a mother liquor. When the mixed acids being fractionated are glyceride oil acids in which palmitic acid constitutes at least about 70% by weight of the saturated acids and the amine used contains an amount of cyclohexylamine or benzylamine equivalent to the saturated acids, the solidified and isolated amine salt is a palmitic acid amine salt that can be converted to a substantially pure palmitic acid. A process of producing substantially pure palmitic acid from glyceride oil acids by such a fractional crystallization procedure is described in greater detail in copending application Serial No. 529,600 filed of even date, now U. S. Patent No. 2,791,596.

The mother liquor from which the saturated acid amine salts were fractionally crystallized comprises a solution consisting essentially of the morpholine salts of a predominantly unsaturated mixture of saturated and unsaturated fatty acids, or of such fatty acids mixed with epoxy-group-containing fatty acids. This is true whether the original mixture of fatty acids was neutralized with morpholine or with a mixture of cyclohexylamine or dibenzylamine and enough morpholine to neutralize the unsaturated and epoxidized acids. These morpholine salts can readily be converted to the corresponding morpholides by a dehydrative heating in the presence or absence of the solvent. This conversion involves the known reaction:

and the usual reaction conditions and/or catalysts can be used.

Where a mixture of saturated and unsaturated fatty acids, or a material capable of yielding the mixture, e. g., cottonseed oil, contains a proportion of polyolefinic acyls such that the mixture of acyls is equivalent to a mixture of acids in which $$\frac{P}{M+P}$$

is greater than about $\frac{1}{10}$ the proportion of polyolefinic acyls can be reduced by hydrogenating and/or epoxidizing the polyolefinic acyls contained in the acids or in the material capable of yielding the acids. The usual procedure and apparatus for hydrogenating and/or epoxidizing can be employed. The extent of reaction can be followed by the usual control methods such as periodical determination of the iodine number, oxirane content, and/or amount of reactants converted. Where such materials are hydrogenated, the reaction should be terminated before a substantial proportion of the monoolefinic acyls react. The epoxidation reaction can advantageously be continued until some of the monoolefinic acyls react, where, for example, vinyl resin stabilizing properties are more important than brittle point lowering properties. The hydrogenation and/or epoxidation can be applied to the mixture of morpholine salts of the predominantly unsaturated fatty acids produced by the fractionation procedure described, in which mixture the acyls are contained in the morpholine salts of the acids. The reactions can also be applied to the free acids or the morpholides. In any case, a hydrogenation of the predominantly unsaturated acyls should be terminated before enough monoolefinic acyls react to produce a mixture of acyls equivalent to a mixture of acids in which $$\frac{S}{S+M+P+E}$$

is greater than about $\frac{9}{100}$.

Mixtures of saturated and unsaturated fatty acids, or mixtures of such acids and epoxy-group-containing fatty acids, in which mixtures the weight proportions are such that $$\frac{S}{S+M+P+E}$$

and $$\frac{P}{M+P+E}$$

are, respectively, from about $$\frac{1 \text{ to } 9}{100}$$

and less than $\frac{1}{10}$, can be converted to the mixed morpholides provided by this invention by reacting the mixed acids with morpholine by any of the usual procedures for reacting mixed acids with morpholine to produce the corresponding mixed morpholides.

The mixed morpholides provided by this invention exhibit good compatibility with polymers and copolymers of monomers predominating in vinyl chloride, such as polyvinyl chloride, and the vinyl chloride-vinyl acetate copolymers predominating in vinyl chloride. They can be employed as plasticizers in proportions of from about 10 to 80 parts by weight per 100 parts by weight of polymer. The mixed morpholides provided by this invention which contain epoxy groups have the added advantage of imparting heat and light stability to the polymers.

The following examples are illustrative of at least one method of practicing the invention.

EXAMPLE 1

A 100 gram sample of cottonseed oil fatty acids and 32 grams of morpholine were dissolved in 400 ml. of acetone at about 40° C. The acids used were those obtained by the saponification of a refined cottonseed oil and they had an iodine value of 113.7.

When the acetone solution of the morpholine salts of the acids was cooled to 3° C., crystallization occurred. The crystallizing was maintained at about 3° C. for about 48 hours; and the crystals which formed were removed by filtration.

An analysis of aliquots of the crystals and of the mother liquor revealed that the iodine value of the acyl radicals they contained were respectively 38 and 128. The fractional crystallization procedure removed enough saturated acyls so that the remaining acyls corresponded to a mixture of acids in which $$\frac{S}{S+M+P+E}$$

was between $$\frac{1 \text{ to } 9}{100}$$

The filtrate was desolventized by distillation. The residue was mixed with 20 ml. of benzene and refluxed for 16 hours in an apparatus arranged to separate water from the vapors. This dehydrative heating of the morpholine salts produced a mixture of morpholides having an iodine value of 102.4.

A 71.4 gram sample of the mixed morpholides was reacted with 25.8 grams of perbenzoic acid dissolved in 580 ml. of chloroform at a temperature of 0° C. The epoxidation was conducted until the product had an oxirane content of 0.78 mole per mole of sample. This epoxidation converted the acyl radicals of the mixed morpholides to those equivalent to a mixture of acids in which $$\frac{P}{M+P+E}$$

is less than $\frac{1}{10}$.

The mixed morpholides of the predominantly unsaturated fatty acids, "mixed morpholides," and those of the partially epoxidized predominantly unsaturated fatty acids, "epoxidized morpholides," were compared with di-2,ethylhexyl phthalate, "DOP," as the plasticizer in a standard formulation, comprising: 63.5% of a vinyl chloride-vinyl acetate (95–5) copolymer, 35% plasticizer, 0.5% stearic acid, and 1.0% basic lead carbonate.

Table I

| | Compatibility | Tensile strength, p. s. i. | 100% Modulus, p. s. i. | Elongation, Percent | Brittle point, °C. |
|---|---|---|---|---|---|
| Epoxidized morpholides | Good | 2,920 | 1,460 | 290 | −17 |
| Mixed morpholides | Poor | 2,770 | 1,310 | 300 | −41 |
| DOP | Good | 3,030 | 1,600 | 300 | −33 |

In all of the examples, the compatibility was determined on the basis that bleeding within 15 days was "poor." A lack of bleeding for at least 45 days was "good."

EXAMPLE 2

Samples of the refined cottonseed oil used in Example 1 were subjected to a selective hydrogenation, using hydrogen under 2 to 3 p. s. i. pressure, in the presence of 0.5% nickel as a catalyst at 400° F., to convert the polyolefinic acyls to monoolefinic acyls. Sample A was hydrogenated to an iodine value of 63.5, which converted the acyls to those equivalent to acids in which $$\frac{P}{M+P}=\frac{0.23}{100}$$

and sample B was hydrogenated to an iodine value of 69.1 which is equivalent to $$\frac{P}{M+P}=\frac{7.3}{100}$$

(as determined by "the iodine value-thiocyanogen value" method).

Samples A and B were saponified, and their acids were fractionated in the form of amine salts by the procedure described in Example 1. The predominantly unsaturated acid fractions were converted to their morpholides by the procedure described in Example 1. The morpholides, "morpholides from A" and "morpholides from B," were compared with DOP in the standard formulation described in Example 1.

Table II

| Plasticizer | Compatibility | Tensile strength, p. s. i. | 100% Modulus, p. s. i. | Elongation, Percent | Brittle point, °C. |
|---|---|---|---|---|---|
| Morpholides from A | Good | 2,880 | 1,450 | 300 | −43 |
| Morpholides from B | Good | 2,830 | 1,460 | 310 | −39 |
| DOP | Good | 2,990 | 1,640 | 300 | −33 |

EXAMPLE 3

A 100 gram sample of peanut fatty acids and 32 grams of morpholine were dissolved in 400 ml. of acetone at about 40° C. The acids used were those obtained by the saponification of a hydrogenated peanut oil and they had an iodine value of 65.0.

This amine salt was fractionated by the procedure described in Example 1, and the predominantly unsaturated fraction, whose acids had an iodine value of 82.0, was converted to the morpholide by the same procedure given in Example 1. This mixed morpholide whose iodine value was 68.0 was compared with DOP in the standard formulation described in Example 1.

| Plasticizer | Compatibility | Tensile strength, p. s. i. | 100% Modulus, p. s. i. | Elongation, Percent | Brittle point, °C. |
|---|---|---|---|---|---|
| Mixed morpholides of Example 3 | Good | 2,790 | 1,400 | 310 | −41 |
| DOP | Good | 2,990 | 1,640 | 300 | −33 |

We claim:
1. A plastic composition which is stable against exudation of plasticizer comprising a mixture containing a vinyl chloride polymer selected from the group consisting of polyvinyl chloride and a vinyl chloride-vinyl acetate copolymer which contains a predominant amount of vinyl chloride, and a plasticizer therefor comprising a morpholide mixture of the morpholides of saturated vegetable oil fatty acids (S) and the morpholides of unsaturated vegetable oil fatty acids consisting of monoolefinic fatty acids (M), polyolefinic fatty acids (P), and epoxy-group-containing monoolefinic acids (E), in which morpholide mixture the proportion of the saturated acids is such that

$$\frac{S}{S+M+P+E}$$

is about from $$\frac{1 \text{ to } 9}{100}$$

by weight, and the proportion of the polyolefinic fatty acids, based on the total unsaturated acids is such that $$\frac{P}{M+P+E}$$

is less than about $\frac{1}{10}$ by weight, the value of E being zero when no epoxidized acids are present, said morpholide mixture being present in the proportion of about from 10 to 80 parts per 100 parts of the vinyl chloride polymer.

2. The plastic composition of claim 1 wherein the morpholide mixture of the morpholides of the saturated and unsaturated vebetable oil fatty acids is obtained by hydrogenating cottonseed oil.

3. The plastic composition of claim 1 wherein the morpholide mixture of the morpholides of the saturated and unsaturated vegetable oil acids is obtained by epoxidizing cottonseed oil.

References Cited in the file of this patent

UNITED STATES PATENTS

| | | |
|---|---|---|
| 2,339,056 | Craver | Jan. 11, 1944 |
| 2,429,679 | Georges | Oct. 28, 1947 |
| 2,631,988 | Fein | Mar. 17, 1953 |
| 2,654,754 | Bruce et al. | Oct. 6, 1953 |
| 2,687,389 | Dazzi | Aug. 24, 1954 |
| 2,776,282 | Cusic | Jan. 1, 1957 |